Aug. 19, 1969 R. DALLOIS ET AL 3,462,128
METERING AND MIXING DEVICE
Filed May 24, 1966 2 Sheets-Sheet 1
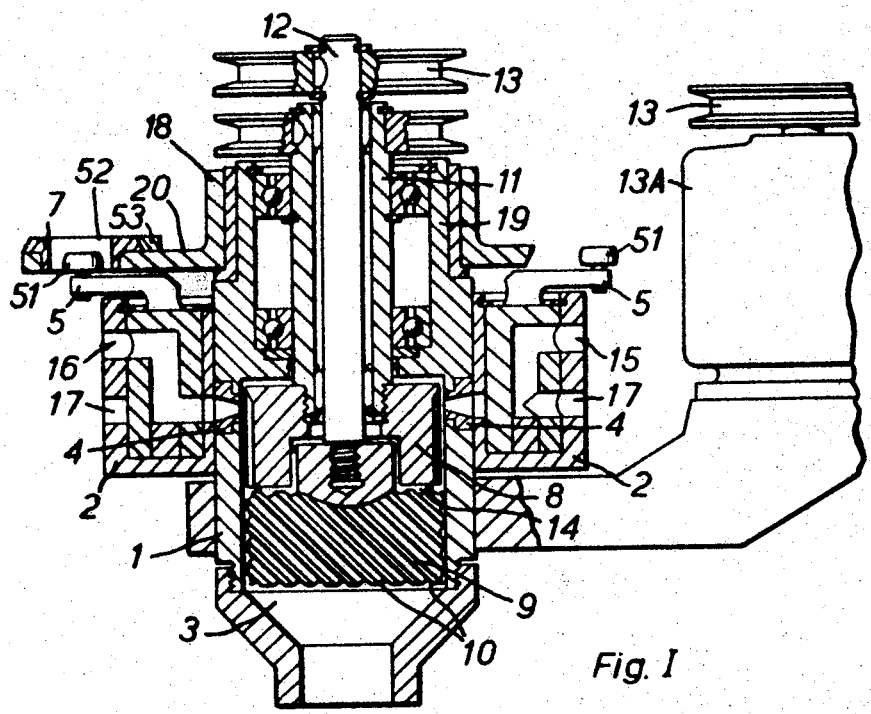
Fig. I
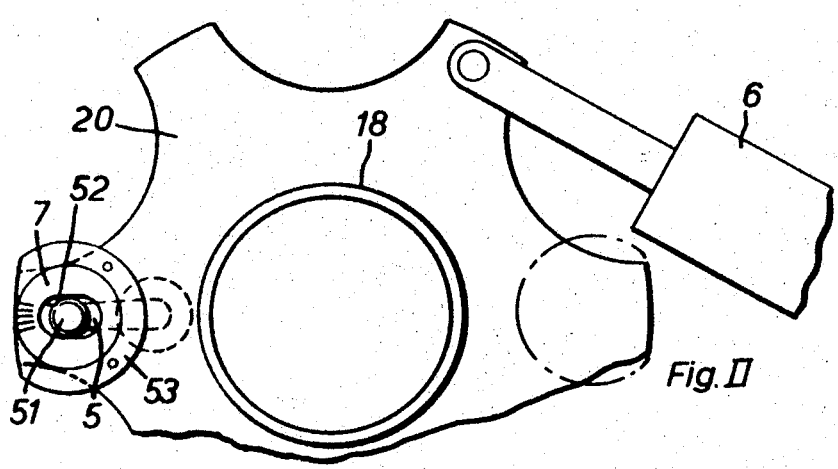
Fig. II

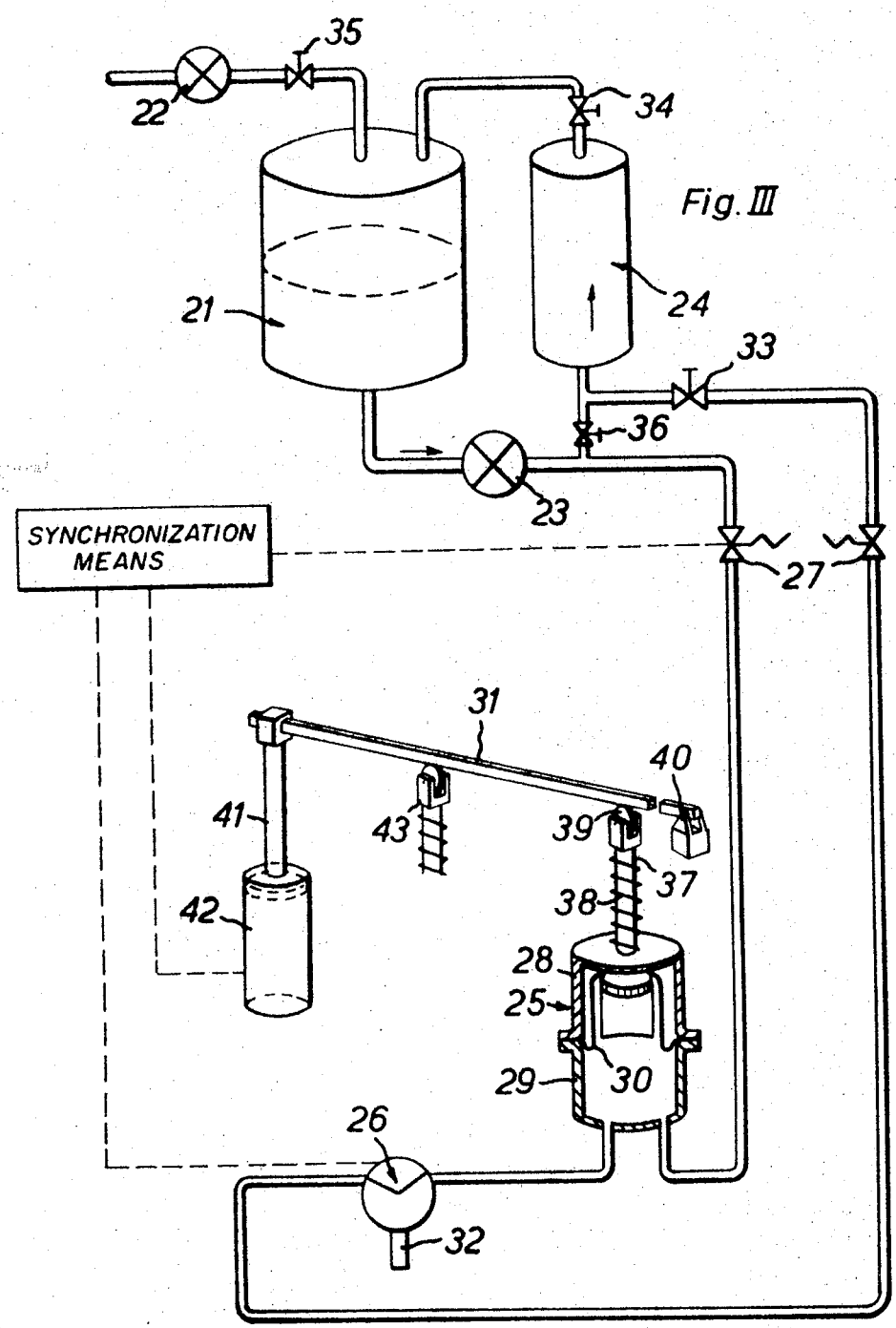
Fig. III

United States Patent Office 3,462,128
Patented Aug. 19, 1969

3,462,128
METERING AND MIXING DEVICE
Robert Dallois, Saint-Maur, Val-de-Marne, Roger Robic, Levallois Parret, Hauts-de-Seine, and Gisele Dufour, Paris, France, assignors to The Dunlop Company Limited, London County, England, a British company
Filed May 24, 1966, Ser. No. 552,585
Claims priority, application France, Oct. 13, 1965, 34,830
Int. Cl. B01f *15/02, 7/10;* B67d *5/56*
U.S. Cl. 259—6                                     6 Claims

ABSTRACT OF THE DISCLOSURE

Liquids, such as ingredients in the production of polyurethane foam, are mixed in a device comprising a mixing chamber having at least two inlets for the liquid ingredients, an outlet for the mixed ingredients and at least two rotors mounted within said chamber for rotation about a common axis or about axes substantially parallel to each other, the rotors being arranged so that the periphery of each rotor can sweep close to at least a portion of the mixing chamber wall, at least one of said rotors having peripheral indentations to assist mixing. The liquids to be mixed are measured and dispensed in successive equal amounts in a dispenser having an inlet communicating with a reservoir for the liquid. The mixer has at least one valve having an inlet port which communicates with the outlet of the dispenser, a by-pass port which communicates with the reservoir, and an outlet port for discharge of the liquid. Means is provided to circulate the liquid sequentially from the outlet of the dispenser to the mixer valve and the inlet of the dispenser, means is provided to interrupt flow of liquid to the dispenser, and a common actuating means is utilized to effect synchronization of: (a) interruption of flow of liquid to the dispenser, (b) operation of the dispenser to discharge liquid to the valve and (c) adjustment of the valve to allow the liquid to flow through the outlet port.

---

This invention relates to a mixing device suitable for mixing together liquid ingredients in the production of polyurethane foam. The invention further relates to apparatus suitable for measuring and dispensing liquid ingredients, especially in said production of polyurethane foam.

The mixing device of the invention is one which has a mixing chamber having two or more inlets for liquid polyurethane foam-forming ingredients, an outlet for the mixed ingredients and two or more rotors mounted within said chamber for rotation about a common axis or about axes substantially parallel to each other, so that the periphery of each rotor sweeps close to at least a portion of the mixing chamber wall, at least one of said rotors having peripheral indentations to assist mixing.

The inlets of the mixing chamber are conveniently fed via valves which in their open position permit ingress of the respective ingredient to the inlet of the mixing chamber and in their closed position divert flow of ingredient into a by-pass conduit, said valves being arranged for synchronous operation.

To obtain really good mixing the rotors should have a shape and dimensions such that only a small space separates the periphery of the rotors from at least a portion of the inner surface of the mixing chamber wall. The mixing chamber and the rotors are preferably of circular cross-section, a narrow annular space separating the inner surface of the mixing chamber from the periphery of the rotors. The rotors are preferably mounted so that only a small space separates the end of one from the end of the adjacent rotor, and this space is conveniently sealed, for instance by a sealing ring or using a cushion of compressed air.

As stated above, at least one of the rotors has indentations in its periphery adjacent the wall of the mixing chamber, and the other rotor or rotors can have similar or different indentations. The indentations are conveniently in the form of grooves, which can be, for instance, straight grooves parallel to the axis of rotation of the rotor, or helical grooves of any suitable pitch. The exact dimensions and arrangement of the grooves or other indentations depends to a large extent upon the viscosity of the ingredient, the pressure at which it is fed to the mixing chamber and the nature of mixture required, and suitable forms can be ascertained by simple experiment.

The rotors of the mixing device are preferably rotated so that there is a relative angular velocity between them—or where more than two rotors are used, between adjacent rotors. Thus, where two rotors are used they can, for example, be driven in opposite directions at the same or different angular velocities, or in the same direction at the same or different angular velocities, or one of the rotors can be fixed and the other rotated. However, it is preferable that the linear velocity of the peripheries of adjacent rotors should be such that there is relative movement between them, as this results in improved mixing.

The rotors can be driven by any convenient means whether mechanical, electro-mechanical, pneumatic or hydraulic. Where the rotors are carried on concentric shafts, in the manner illustrated in the accompanying drawings, the shafts are conveniently driven, using a system of pulleys and belts, by an electric motor.

Steel and Teflon (a polymer of tetrafluroethylene) have been found to be suitable materials for construction of the rotors, valves and mixing device, but the choice of materials will, of course, depend upon the chemical nature of the ingredients to be mixed and the conditions used, for instance temperature and pressure of the ingredients.

The invention also includes apparatus which provides a very efficient yet simple means of dispensing accurate amounts of liquids, for instance the mixing device of this invention. Accordingly, the invention also includes apparatus comprising a dispenser having an inlet and an outlet for the liquid, said inlet communicating with a reservoir for the liquid; a valve having an inlet port which communicates with the outlet of the dispenser, a by-pass port which communicates with the reservoir, and an outlet port for discharge of the liquid; means to circulate the liquid between the outlet of the dispenser, the valve and the inlet of the dispenser; means to interrupt flow of liquid to the dispenser; and means to replace liquid discharged from the valve; the dispenser, interrupting means and valve being all operated in accordance with a common actuating means, whereby interruption of flow of liquid to the dispenser, operation of the dispenser to discharge liquid to the valve and adjustment of the valve to allow the liquid to flow through the outlet port can all be synchronised so that successive, predetermined amounts of the liquid are discharged from the valve.

Since the apparatus of this invention does not require the use of conventional precision pumps with delicate moving parts it can be used to dispense liquid products in general. Thus very viscous liquids and suspensions in liquid of pulverulent solid material can be metered, and the term "liquid ingredient" as used herein includes such materials.

The dispenser of the apparatus of the invention is conveniently a diaphragm pump, and the apparatus for measuring and dispensing liquid is accordingly described below with particular reference to the use of diaphragm pumps as the dispensers, though the invention is not limited to the use of such pumps. Moreover, although the invention is described below with particular reference to the measuring, dispensing and mixing of liquid ingredients for use in a polyurethane foam-forming reaction, it will be appreciated that the mixing device and the measuring and dispensing apparatus could be used for other liquids.

In the production of polyurethane foam the various ingredients are not normally required in similar amounts by weight or even by similar volume, the amounts used being determined by the nature of the ingredients and the type of foam required. Consequently, the volume of the chamber of the diaphragm pump swept by the diaphragm will usually not be the same for each ingredient. The difference in volumes of the various ingredients to be fed to the mixing device at each operation can, if desired, be achieved by using diaphragm pumps whose chambers are of different volumes according to the amount of the various ingredients required to be used. Alternatively, diaphragm pumps of substantially the same (or different) capacity can be used with an actuating means which provides different amounts of displacement of the diaphragm at each operation. An example of such a means is for the cylinders of the diaphragm pumps to be arranged in a straight line and for their pistons to be depressed by means of a rod or beam extending over the pistons from a pivotal attachment at one end and urged downwards against the pistons at each operation. If the pivot is fixed, the amount by which the pistons in the diaphragm pumps are depressed can be made to vary with their distance from the pivoted end of the rod. It will be apparent to those skilled in the art that the depression of the pistons of the diaphragm pumps can be effected by various other mechanical, electrical or pneumatic means.

It will be seen that the diaphragm pump may be considered, as regards both its function and operation as a hydraulic jack having adjustable cylinder volume, and in fact the diaphragm pump can be replaced by such a jack where the volume of ingredient to be dispensed at each operation is large enough as to make it possible to ignore leakage of liquid around the piston, which normally occurs in such jacks. However, where the volume of liquid to be dispensed at each operation is relatively small—say four litres or less—it is generally preferable to use a diaphragm pump.

The mixing device and the measuring and dispensing apparatus of this invention are suitable for the production of polyurethane foam, which can be derived, for instance, from a polyether polyol or polyester polyol—so called polyether polyurethane and polyester polyurethane. The polyurethane foam can be of the flexible, rigid or semi-rigid types.

A preferred form of low pressure mixing device according to the present invention is illustrated in FIGURES I and II of the accompanying drawings. This device is suitable for mixing two ingredients and has two valves, one for each ingredient. FIGURE I is an elevation in section and FIGURE II is a plan view of the control means for obtaining synchronous operation of the valves.

In FIGURE I a mixing chamber 1 of circular cross-section has a nozzle (outlet port) 3 for the egress of the mixed ingredients, and two inlets 4 in the form of calibrated jets, respectively for the ingress of the two polyurethane foam-forming ingredients. Of course, each "ingredient" can consist of more than one component. By appropriate choice of size of jets, the injection pressure of the ingredient fed to the mixing chamber can be varied. The calibrated jets respectively communicate between the interior of the mixing chamber and two-way valves 2. Each of the valves has an inlet, an outlet and a by-pass port whose opening and closing is controlled by a cylindrical gate. The gate has a control arm 5 which carries at its extremity an upright peg 51. In FIGURE I the valve on the left-hand side of the drawing is shown in its "open" position, that is the position which permits foam-forming ingredient to flow via the inlet port 16 and the jet 4 into the mixing chamber. The valve on the right-hand side is in the "closed" position, that is the position in which foam-forming ingredient passing through the inlet port 15 is prevented from entering the jet 4 and leaves the valve by way of the by-pass port 17 from which it can thereby be returned to its source.

In the body portion of the mixing chamber there are two rotors 8 and 9, rotor 9 being shown un-sectioned. The rotors are of circular cross-section and substantially the same diameter, mounted one about the other and spaced apart by a very small distance by seal 14. Each rotor conforms closely to the profile of the mixing chamber being separated therefrom by a narrow annular space, and has a series of peripheral grooves 10 to assist in mixing. The grooves of rotor 9 are shown in FIGURE I, but the grooves of rotor 8 are not shown as that rotor is shown in section. Rotors 8 and 9 are carried respectively by concentric shafts 11 and 12 which can be driven respectively by the pulleys 13 from an electric motor 13A which can conveniently be mounted on the support for the mixing device as shown in FIGURE I.

The opening and closing of the valves 2 is controlled by the mechanism shown in plan view in FIGURE II. The collar 18, which is rotatable about the extension 19 of the mixing chamber, has a flange 20 which carries means for controlling the valves 2. The part of the collar on the right-hand side of FIGURE I is shown in broken form to reveal more clearly the control arm 5 and its peg. The valve control means comprises a cylindrical block 7 having an elongated aperture 52 which communicates between the top and bottom of the block. The block 7 is retained in a circular aperture in the flange 20 by means of a collar 53 which is releasably attached to the flange 20 by means of screws (not shown). The aperture 52 encloses the peg 51 carried by the valve control arm 5. The portion of the upper edge of the cylindrical block 7 where it touches the edge of the flange 20 carrying it has a scale inscribed on its upper surface, and the flange has a reference line inscribed in its edge.

A similar control means (not shown) is carried by flange 20 in a position diametrically opposite that just described, for control of the valve shown in the right-hand side of FIGURE I. A pneumatic jack 6 or similar pneumatic or hydraulic means is connected to the periphery of flange 20 to provide angular displacement of the flange about the extension 19 of the mixing chamber.

The typical method of operation of the mixing device illustrated in FIGURES I and II is described below with reference to use with a continuous supply of two foam-forming ingredients which are fed respectively to inlet ports 15 and 16. It should be understood that in the normal operation of the mixing device the two valves would not simultaneously be in the positions shown in FIGURE I; they would either both be in the "open" position or in the "closed" position as defined above. In the following description it is assumed that both valves are initially in the position shown in the right-hand side of FIGURE I, that is the closed position, with a continuous stream of each ingredient flowing in through the inlet port and out through the by-pass port.

The cylindrical block 7 in the valve control means is set at its normal or zero position and firmly held in that position by means of the retaining collar 53. The rotors 8 and 9 are set in motion, preferably rotating in opposite directions, until a steady speed has been obtained and until the temperature and pressure of the ingredients passing through the valves 2 are at the desired values. When a "shot" of foamed material is required the flanged collar 20 is displaced in an angular direction about the extension of the mixing chamber by means of the pneumatic jack 6. This displacement causes the side of the elongated aperture 52 to bear against the peg 51 and to move the latter a short distance thereby causing the cylindrical gate of the valve to move so that the outlet port of the valve is opened and the by-pass port closed. An exactly similar adjustment is made to the other valve, and consequently the two ingredients flow through the two calibrated jets 4 into the annular space between the rotors and the inner surface of the mixing chamber, the ingredients are thoroughly mixed together and the resulting mixture passes down the mixing chamber and out of the orifice at the bottom. The valves are kept in the "open" position for as long as is necessary to provide the desired amount of the mixture and at the end of that time both valves are returned to their closed position by movement of the pneumatic jack which causes the cylindrical block 7 and the peg 51 to engage in the converse manner to that described above.

If it is desired that the valves should not open simultaneously, the cylindrical block 7 of one of the valve control means can be adjusted by being rotated to a small degree thereby changing the angle at which the side of the elongated aperture 52 bears against the peg 51. This results in the valve being opened either before or after the other valve depending on which way the cylindrical block 7 has been rotated in its housing. The scale inscribed on the block 7 enables differential opening of the valves to be calibrated.

It will be appreciated that the mixing device illustrated in FIGURES I and II can readily be augmented by the incorporation of one or more further valves to accommodate one or more further foam-forming ingredients, appropriate control means—conveniently similar to that described above—being used.

A preferred form of the measuring and dispensing apparatus of the present invention is illustrated in FIGURE III of the accompanying drawings. The apparatus is for the storage, accurate measurement and dispensing of a liquid ingredient to be used in the production of a polyurethane foam by means of a mixing device where the measured portions of the ingredient are mixed with accurately measured portions of the other foam-forming ingredients. The means for storing, measuring and dispensing these other ingredients can be duplicates of the apparatus shown in FIGURE III except, of course, that normally a common-single mixing device will be used for all the ingredients.

In FIGURE III a storage container 21 for the ingredient is fed through valve 35 by means of a feed pump 22. Valve 35 makes it possible to maintain the ingredient at a constant level in the container 21. Container 21 is part of two inter-related circuits. The first comprises container 21, pump 23, valve 36, heat exchanger 24 and valve 34; and by means of this circuit it is possible to maintain the contents of container 21 at a constant temperature by recycling them through the heat exchanger. Container 21, heat exchanger 24 and valve 34 form part of the second circuit which includes cut-off valves 27, diaphragm pump 25, mixing device 26 and valve 33. The mixing device 26 has a two-way valve which in the position illustrated in FIGURE III prevents liquid from flowing to the mixing chamber and thence to outlet 32 but by-passes it so that it flows from the diaphragm pump 25 back to the heat exchanger 24. In the other position the valve permits liquid to flow from the diaphragm pump to the mixing chamber and thence to outlet 32. The mixing device is conveniently one in the form of that illustrated in FIGURES I and II of the accompanying drawings.

The diaphragm pump 25 comprises upper and lower chambers 28 and 29 between which there is gripped the periphery of a diaphragm 30 which is attached to the head of a piston 37. In the drawing the piston is shown in its fully raised position, the diaphragm being fully withdrawn into the upper chamber 28 thereby providing a space of maximum volume beneath it. The upper end of the piston 37 carries a freely rotatable contact wheel 39 which is in contact with a beam 31, the wheel being urged against the beam by means of a spring 38. The beam 31 is pivotally mounted at one end on a horibontal pivot 40. The other end is attached to a piston 41 engaging with cylinder 42 which together provide means for moving beam 31 about its pivot. In the drawing beam 31 is inclined upwardly from its pivoted end. Between the portion of the beam that contacts wheel 39 and the end of the beam attached to the piston 41, there is shown a second wheel 43 which is the contact wheel of an apparatus for measuring and dispensing the second ingredient.

The valves 33 and 34 provide means for controlling the throughput of ingredient through the various circuits. The pumps 22 and 23 can be of any conventional type and do not need to have any great accuracy as to their delivery rate.

The apparatus shown in FIGURE III relates to the measurement and dispensing of a single foam-forming ingredient fed to mixing device 26. In the description of the operations of the apparatus which follows it is assumed that the other foam-forming ingredients are measured and dispensed by similar apparatus whose relationship with the apparatus shown in FIGURE III is indicated by the position of the contact wheel 43. The said second ingredient is conveniently fed to the mixing device 26 in a similar way to that shown for the first ingredient in FIGURE III, each ingredient stream having its own inlet, outlet and by-pass port in the mixing device. The actuating means for control piston 41 can also be that which controls cut-off valve 27 and the mixing device valve in respect of each ingredient so that the ingredients can be fed to the mixing device chamber in unison.

The operation of the apparatus shown in FIGURE III is typically as follows, starting with the diaphragm 30 in its fully withdrawn position, and the mixing device valve adjusted so that its inlet port is in communication with the by-pass port. As will be described in greater detail below, the diaphragm and mixing device valve will normally be in the desired positions following completion of a previous mixing cycle.

The liquid ingredient is fed into container 21 by means of pump 22 until the level of ingredient in the container reaches a desired level, then the valve 35 is closed. Pump 23 is then brought into action with the valves 34 and 36 open. When steady conditions are attained the common actuating means for the apparatuses controlling the two ingredients is operated so as to close cut-off valve 27 and cause the piston 41 to move downward drawing beam 31 with it. The beam thus depresses piston 37 and results in the ingredients in the chamber of the diaphragm pump 25 being forced out of the chamber and into the chamber of the mixing device.

The actuating means simultaneously acts on the apparatus controlling flow of the other ingredient causing a pre-determined amount of it to be injected into the mixing chamber by way of the respective inlet port substantially simultaneously with injection of the first ingredient, and the ingredients become mixed together before being fed to a mould, trough or other support means in which the polyurethane foam can generate.

Once the contents of the diaphragm pump have been ejected the following sequence of recovery operations take place:

(1) The actuating means ceases to operate thereby causing the piston in cylinder 42 to rise, under the influence of spring 38, assisted if need be by other recuperation means, thereby raising ipston 37 and its attached diaphragm 30 to the top of the chamber of the diaphragm pump. Spring 38 continues to urge the contact wheel 39 against the beam 31.

(2) The valve of mixing device 26 is re-adjusted so that the inlet port is once again brought into communication with the by-pass port and is cut-off from the mixing chamber.

(3) The cut-off valves 27 are re-opened.

These three operations once again permit the flow of ingredient through the chamber of the diaphragm pump, through the mixing device by way of the by-pass and to return to the storage container by way of heat exchanger 24. Further fresh ingredient is fed into the storage container 21 as required by opening valve 35 and use of pump 22, to compensate for the amount of ingredient delivered to the mixing device. The whole cycle can then be repeated by use of the actuating means, which conveniently takes the form of an electro-mechanical control.

Having now described our invention—what we claim is:

1. Apparatus for measuring and dispensing a liquid in successive equal amounts, comprising in combination a dispenser having an inlet and an outlet for the liquid, said inlet communicating with a reservoir for the liquid; a valve having an inlet port which communicates with the outlet of the dispenser, a by-pass port which communicates with the reservoir, and an outlet port for discharge of the liquid; means to circulate the liquid between the outlet of the dispenser, the valve and the inlet of the dispenser; means to interrupt flow of liquid from the reservoir to the dispenser; means to effect synchronisation of: (a) interruption of flow of liquid from the reservoir to the dispenser, (b) operation of the dispenser to discharge liquid to the valve and (c) adjustment of the valve to allow the liquid to flow through the outlet port.

2. Apparatus according to claim 1, in which the dispenser is a diaphragm pump.

3. Apparatus according to claim 1, further comprising heating means to maintain the liquid at a predetermined temperature, said reservoir and said heating means being operatively connected between the by-pass port of said valve and the inlet of the dispenser.

4. Apparatus according to claim 3, further comprising means interconnecting the reservoir and the temperature-maintaining means to enable liquid flow therebetween without flowing to the dispenser.

5. Apparatus according to claim 1, further comprising a mixing device suitable for mixing together liquid ingredients in the production of a polyurethane foam, said mixing device comprising a mixing chamber having at least two inlets for liquid polyurethane foam-forming ingredients, one of said inlets being in communication with said outlet port for discharge of the liquid, an outlet from said mixing chamber for the mixed ingredients, at least two rotors mounted within said chamber for rotation about axes extending in the same direction, the rotors being arranged with respect to the mixing chamber wall so that the periphery of each rotor can sweep close to at least a portion of the mixing chamber wall, and at least one of said rotors having peripheral indentations to assist mixing.

6. A mixing device suitable for mixing together liquid ingredients in the production of a polyurethane foam, comprising a mixing chamber having at least two inlets for liquid polyurethane foam-forming ingredients, an outlet for the mixed ingredients and at least two rotors mounted within said chamber for rotation about axes extending in the same direction, the rotors being arranged with respect to the mixing chamber wall so that the periphery of each rotor can sweep close to at least a portion of the mixing chamber wall, at least one of said rotors having peripheral indentations to assist mixing, at least two valves through which respectively each of the mixing chamber inlets can be fed, each valve being so constructed that in its open position it permits ingress of the respective ingredient to the inlet of the mixing chamber and in its closed position it diverts flow of ingredient into a by-pass conduit, and means to provide synchronous operation of the valves comprising for each valve a slotted member, a peg operably connected with each valve to engage within a slot provided in said slotted member, and means to move the slotted members in unison to act on their respective pegs and operate the valves in unison.

References Cited

UNITED STATES PATENTS

| | | | |
|---|---|---|---|
| 3,318,579 | 5/1967 | Foucault | 259—6 |
| 3,163,402 | 12/1964 | Yamashita | 259—6 |
| 3,180,350 | 4/1965 | Rill et al. | 259—7 XR |
| 2,249,263 | 7/1941 | Wheelwright | 259—6 |
| 2,657,628 | 11/1953 | Von Stoeser | 259—8 XR |
| 2,788,953 | 4/1957 | Schneider | 259—4 |
| 2,794,447 | 6/1957 | Spitz | 137—607 XR |
| 2,857,144 | 10/1958 | Gurley et al. | 259—7 |
| 2,946,488 | 7/1960 | Kraft | 222—137 XR |
| 3,206,171 | 9/1965 | Levake | 259—8 |
| 3,218,039 | 11/1965 | Baer | 259—6 |

FOREIGN PATENTS 340,044   9/1959   Switzerland.

ROBERT W. MICHELL, Primary Examiner

JOHN M. BELL, Assistant Examiner

U.S. Cl. X.R.

137—607; 222—137; 259—21